United States Patent
Mangal et al.

(10) Patent No.: US 10,726,716 B2
(45) Date of Patent: Jul. 28, 2020

(54) VEHICLE TO PERSON COMMUNICATION WITH INTERACTION-MODES SELECTED BASED ON HESITATION BY THE PERSON

(71) Applicant: Delphi Technologies, LLC, Troy, MI (US)

(72) Inventors: Nandita Mangal, Palo Alto, CA (US); Michael H. Laur, Mission Viejo, CA (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 0 days.

(21) Appl. No.: 15/989,258

(22) Filed: May 25, 2018

(65) Prior Publication Data

US 2019/0362626 A1  Nov. 28, 2019

Related U.S. Application Data

(60) Provisional application No. 62/675,811, filed on May 24, 2018.

(51) Int. Cl.
| | | |
|---|---|---|
| *G08G 1/005* | (2006.01) | |
| *G06K 9/00* | (2006.01) | |
| *G08G 1/096* | (2006.01) | |
| *G08G 1/0968* | (2006.01) | |
| *G08G 1/16* | (2006.01) | |

(52) U.S. Cl.
CPC ......... *G08G 1/005* (2013.01); *G06K 9/00348* (2013.01); *G08G 1/096* (2013.01); *G08G 1/096877* (2013.01); *G08G 1/166* (2013.01)

(58) Field of Classification Search
None
See application file for complete search history.

(56) References Cited

U.S. PATENT DOCUMENTS

| | | | | |
|---|---|---|---|---|
| 6,140,939 A | * | 10/2000 | Flick | ........................ B60R 25/04 340/12.28 |
| 8,738,280 B2 | * | 5/2014 | Haran | ..................... G08G 1/168 340/436 |

(Continued)

FOREIGN PATENT DOCUMENTS

CN  104 571 998 A  4/2015

OTHER PUBLICATIONS

European Search Report for Application No. 19176106.3. European Patent Office, dated Aug. 23, 2019.

*Primary Examiner* — Chico A Foxx

(57) ABSTRACT

A system for operating an automated vehicle includes an output-device, a perception-device and a controller-circuit. The output-device is configured to convey a message from a host-vehicle to a person. The perception-device is configured to detect a reaction to the message by the person. The controller-circuit is in communication with the output-device and the perception-device. The controller-circuit is configured to operate the output-device in accordance with a first-interaction-mode to convey the message, determine that the reaction corresponds to hesitation by the person, and in response to hesitation by the person, operate the output-device in accordance with a second-interaction-mode to convey the message in accordance with a second-interaction-mode, said second-interaction-mode characterized as different from the first-interaction-mode.

21 Claims, 3 Drawing Sheets

(56) References Cited

U.S. PATENT DOCUMENTS

| | | | | |
|---|---|---|---|---|
| 9,196,164 | B1* | 11/2015 | Urmson | G08G 1/166 |
| 9,694,736 | B2* | 7/2017 | Williams | B60Q 1/0094 |
| 9,868,391 | B1* | 1/2018 | Fairfield | B60Q 5/005 |
| 9,878,659 | B2* | 1/2018 | Williams et al. | B60Q 1/50 |
| 9,881,503 | B1* | 1/2018 | Goldman-Shenhar | G08G 1/166 |
| 9,928,734 | B2* | 3/2018 | Newman | B60Q 5/005 |
| 9,989,966 | B2* | 6/2018 | Wei | B60W 30/00 |
| 2014/0306799 | A1* | 10/2014 | Ricci | H04W 4/21 340/5.83 |
| 2014/0309871 | A1 | 10/2014 | Ricci | |
| 2017/0088039 | A1* | 3/2017 | Williams | B60Q 1/50 |
| 2018/0365993 | A1* | 12/2018 | Makke | G08G 1/096741 |

\* cited by examiner

VEHICLE TO PERSON COMMUNICATION WITH INTERACTION-MODES SELECTED BASED ON HESITATION BY THE PERSON

TECHNICAL FIELD OF INVENTION

This disclosure generally relates to a system for operating an automated vehicle, and more particularly relates to a system that operates an output-device in a first-interaction-mode to convey a message to a person, and if the person hesitates, then operates an output-device in a second-interaction-mode to convey the message.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
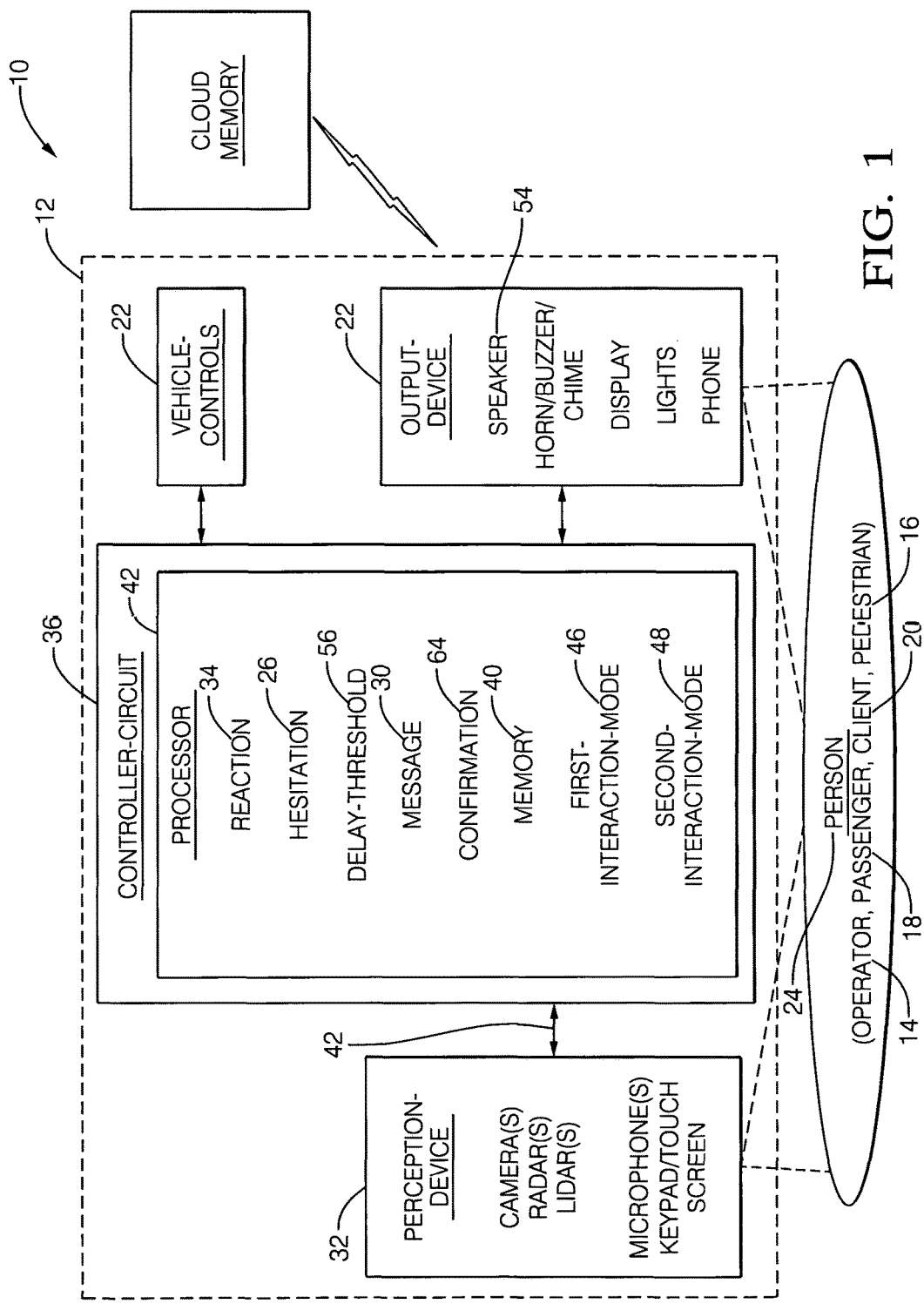
FIG. 1 is a diagram of a system in accordance with one embodiment.

FIG. 1 illustrates a non-limiting example of a system 10 for operating an automated vehicle, e.g. a host-vehicle 12. The host-vehicle 12 may be characterized as an automated vehicle, i.e. an automated-mobility-on-demand (AMOD) type of vehicle. As used herein, the term automated vehicle may apply to instances when the host-vehicle 12 is being operated in an automated-mode, i.e. a fully autonomous mode, where a human-operator 14 of the host-vehicle 12 may do little more than designate a destination to operate the host-vehicle 12, i.e. automation operates the vehicle-controls 22 (e.g. steering, accelerator, brakes) of the host-vehicle 12. However, full automation is not a requirement. It is contemplated that the teachings presented herein are useful when the host-vehicle 12 is operated in a manual-mode where the degree or level of automation may be something less than fully autonomous operation. As will be describe in more detail below, one novel aspect of the autonomous operation of the system 10 described herein is how the host-vehicle 12 or the system 10 interacts with a person 24, for example, a pedestrian 16 walking past the host-vehicle 12, a passenger 18 residing or traveling in the host-vehicle 12, a client 20 preparing to enter the host-vehicle 12, and/or the operator 14 controlling some aspect of the operation of the host-vehicle 12. Here after these examples may be generally referred to as the person 24. In particular, this disclosure teaches how the interaction between the host-vehicle 12 (or the system 10) and the person 24 is varied or adjusted when the person 24 seems to exhibit some form of a hesitation 26 responding to instructions or inquires output by the system 10.

The system 10 includes an output-device 28 configured to convey a message 30 to the person 24. Non-limiting examples of the output-device 28 include, but are not limited to: a speaker, horn, buzzer, chime, a light-pattern device (e.g. something comparable to a red/yellow/green traffic signal), a reconfigurable graphics display, or any combination thereof. The output-device 28 may be mounted on the exterior and/or the interior of the host-vehicle 12 so persons inside and/or outside of the host-vehicle 12 can observe and/or hear the output-device 28. The output-device 28 may be or may include a smart-phone carried by the person 24, which may be in communication with the system 10 by way of, but not limited to: BLUETOOTH®, a cellular phone network, or a Wi-Fi. Furthermore, the output-device 28 may be or may include an actuator (not shown) configured to move all or part of the host-vehicle 12. For example, the actuator may operate a door of the host-vehicle 12 to invite a potential instance of a client 20 to enter the host-vehicle 12, or may operate one or more suspension components to animate the host-vehicle 12 in a manner that, for example, invites the pedestrian 16 to proceed in front of the host-vehicle 12.

The message 30 may include, but is not limited to: an indication that the host-vehicle 12 is available for hire, a name or identification of the client 20 who requested transportation by the host-vehicle 12, a request that the client 20 enter the host-vehicle 12, a statement of, or request to provide, an identification and/or a destination of the client 20 or the passenger 18.

The system 10 includes a perception-device 32 configured to detect a reaction 34 to the message 30 by the person 24. The perception-device 32 may include, but is not limited to: a camera, a microphone, or an input device such as a keypad, a touch-screen, a button, or a switch, or any combination thereof. If the person 24 understands the message 30 and/or has prior knowledge about how to react to the message 30 from the host-vehicle 12, then the reaction 34 by the person 24 is expected to be predictable and timely. However, if the person 24 is confused or for some reason did not receive/detect the message 30 because, for example, the message 30 was audible but there was too much ambient noise or the person is deaf, or the message was visible and the person 24 was looking away or is blind, the reaction 34 may be classified as a hesitation 26 because the person 24 did not react in a timely manner and/or as expected. In response to the hesitation 26 by the person 24, the system 10 may try a different mode (e.g. audible instead of visible, visible instead of audible, or a combination of audible and visible with optional enhancements) of communicating the message 30, as will be explained in more detail below.

The system 10 includes a controller-circuit 36 in communication with the output-device 28 by way of an input 42 and the perception-device 32 by way of an output 44. The controller-circuit 36, hereafter sometimes referred to as the controller 36, may include one or more instances of a processor 38 such as one or more instances of a microprocessor or other control circuitry such as analog and/or digital control circuitry including an application specific integrated circuit (ASIC) for processing data as should be evident to those in the art. While the system 10 described herein is generally described in terms of having a single instance of the controller 36, it is recognized that the functions of the controller 36 may be shared or distributed among several instances of controllers that are each configured for some specific task. Hereafter, any reference to the controller 36 being configured for something is to also be interpreted as suggesting that the processor 38 may also be configured for the same thing. It is also recognized that there may be multiple instance of processors in any instance of the controller 36. The controller 36 may include memory 40, i.e. non-transitory computer-readable storage-medium, including non-volatile memory, such as electrically erasable programmable read-only memory (EEPROM) for storing one or more routines, thresholds, and captured data. The memory 40 may be part of the processor 38, or part of the controller 36, or separate from the controller 36 such as remote memory stored in the cloud, i.e. cloud-memory. The one or more routines may be executed by the controller 36 or the processor 38 to perform steps to output the message 30 based on signals received from, but not limited to, the perception-device 32.

As a first attempt to communicate the message 30 to the person 24, the controller 36 (or the processor 38) is configured to operate the output-device 28 in accordance with a first-interaction-mode 46 to convey the message 30. By way of example and not limitation, the first-interaction-mode 46 may be characterized as operating the speaker only, or the display only, or the phone only, and the message 30 may be the name or identification of the client 20 who requested transportation by way of an app on a phone carried by the client 20. If the person 24 (operator 14, pedestrian 16, passenger 18, and/or client 20) responds in a timely manner and in accordance with expectations, e.g. the client 20 enters the host-vehicle 12 without delay, then the system 10 continues to operate normally. However, if the person 24 exhibits hesitation 26, then the system 10 tries to communicate with the person 24 in a manner different from the first-interaction-mode 46.

The controller 36 (or the processor 38) uses information from the perception-device 32 to determine if/when the reaction 34 corresponds to hesitation 26 by the person 24. Hesitation 26 may be exhibited in different ways, such as, an extended gaze (e.g. more than three seconds) at the host-vehicle 12 without any action/movement by the person 24, certain facial expressions (e.g. open mouth, change in eye opening profile) by the person 24 which may be indicative of distressed or confused emotional state, or a reversal of motion from towards the host-vehicle 12 to away from the host-vehicle 12, e.g. a back and forth motion by the pedestrian 16. As a specific example, if the message 30 is only displayed on a reconfigurable display on the exterior of the host-vehicle 12, the client 20 may exhibit hesitation 26 because the client 20 may not see the message because of a crowd of people, or the client 20 may be blind. Similarly, if the message 30 is only emitted by a speaker on the exterior of the host-vehicle 12, the pedestrian 16 may exhibit hesitation 26 because the pedestrian 16 may not hear the message because excess ambient noise, or the pedestrian 16 may be deaf.

In response to the hesitation 26 by the person 24, the controller 36 or the processor 38 may operate the output-device 28 in accordance with a second-interaction-mode 48 to convey the message 30 in accordance with a second-interaction-mode 48, where the second-interaction-mode 48 is characterized as different from the first-interaction-mode 46. One option for changing interaction-modes is to simply switch between an audible (e.g. speaker) and a visible (e.g. display) form of the message 30 depending on which was used for the first-interaction-mode 46. Another option for the second-interaction-mode 48 is to vary the intensity and/or content of the message 30, but use the same configuration of the output-device that was used for the first-interaction-mode 46. For example, if the speaker was used by the first-interaction-mode 46, the second-interaction-mode 48 may be or include operating the speaker at a louder volume and/or change audible message. If the display was used by the first-interaction-mode 46, the second-interaction-mode 48 may be or include, displaying the message 30 in a different format/color and/or by flashing the display, or both. It is recognized that there are innumerable options for changing how the message 30 is conveyed to the person 24.

Figure 2:
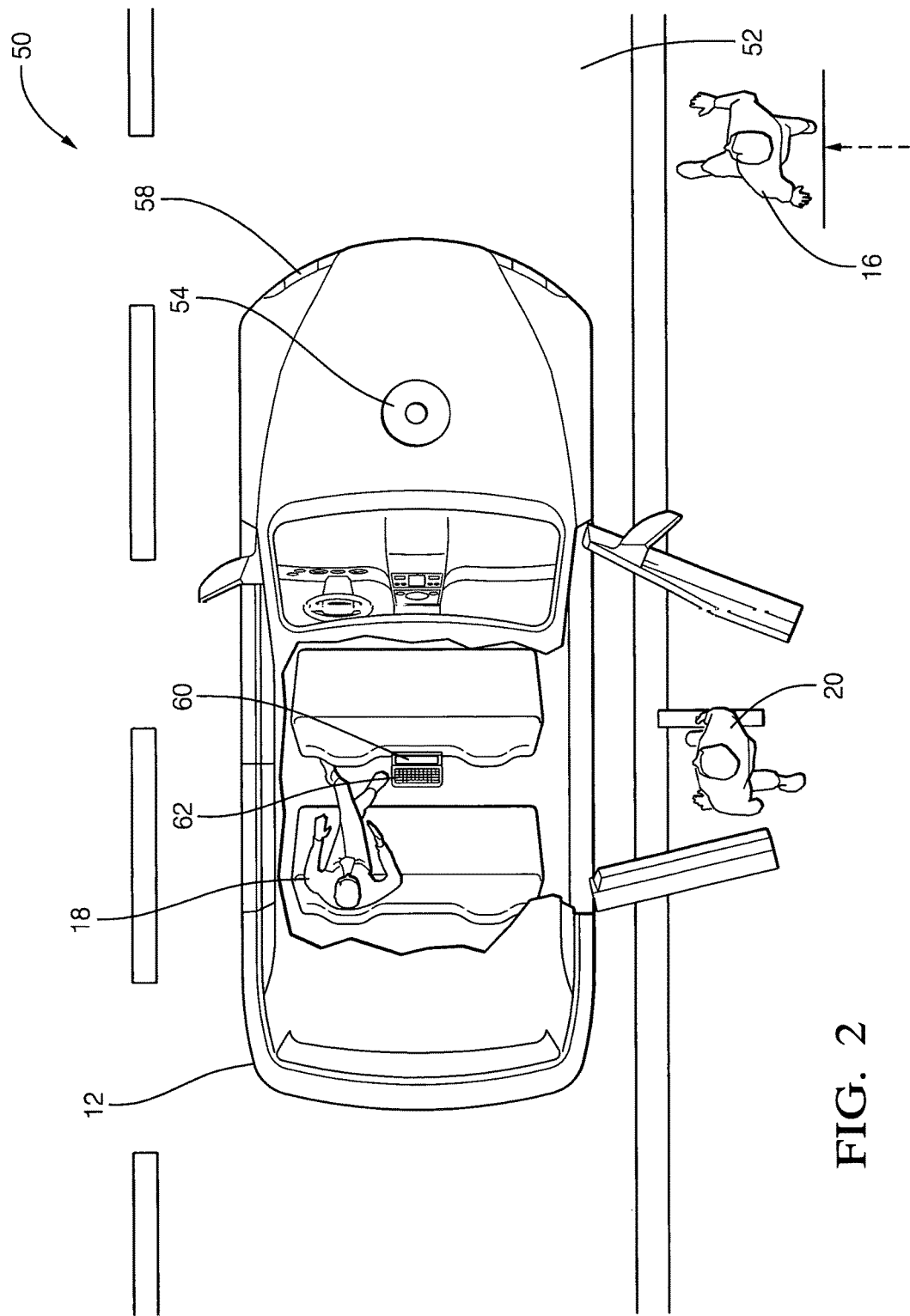
FIG. 2 is an illustration of a scenario encountered by the system of Fig. s in accordance with one embodiment.

FIG. 2 illustrates a non-limiting example of a scenario 50 where the host-vehicle 12 has a passenger 18 present in the host-vehicle 12, and the host-vehicle 12 has stopped to pick-up the client 20. There is also an instance of the pedestrian 16 who has approached the edge of the roadway 52 traveled by the host-vehicle 12, has stopped at the location shown, and is about to cross in front of the host-vehicle 12. If the speaker 54 is used in the first-interaction-mode 46 to convey the message 30 to tell the pedestrian 16 to proceed in front of the host-vehicle 12, but the pedestrian 16 exhibits hesitation 26 by making no reaction 34 to the message 30 for more than a delay-threshold 56, e.g. three seconds (3s), then the system 10 may flash the headlights 58 and/or operate an exterior-display (not shown) to convey the message 30 in accordance with the second-interaction-mode 48. As another example, if the passenger 18 has failed to enter or specify a destination after the interior-display 60 has displayed the message 30 in accordance with the first-interaction-mode 46 asking the passenger 18 to do so using the keyboard 62 or a phone (not shown) possessed by the passenger 18, then the display 60 may flash with bright colors and repeat the message, or a chime (not shown) may be activated as part of the second-interaction-mode 48 to attract the attention of the passenger 18 to the interior-display 60.

If/when the person 24 does respond to the message 30 in some expected/useful and timely manner, the controller-circuit 36 may be configured to continue to operate the output-device 28 in accordance with the first-interaction-mode 46 to convey a confirmation 64 in response to a determination that the reaction 34 does not correspond to hesitation 26 by the person 24. For example, if an external-display (not shown) was used as the first-interaction-mode 46 to convey the message 30 to the pedestrian 18, and there is no hesitation detection, the confirmation 64 to the pedestrian 16 may continue to use the external-display to, for example, indicate a detected position of pedestrian 18 as the means to convey the confirmation 64. If the external-display is a reconfigurable type of display, an arrow may be displayed that points to an area forward of the pedestrian 16 to encourage the pedestrian 16 to continue walking in front of the host-vehicle 12. Alternatively, a string of lights (not shown) across the front of the host-vehicle 12 may be illuminated in a pattern that the pedestrian 16 would perceived to be an invitation to continue walking in front of the host-vehicle 12. Similarly, if the message 30 to the passenger 18 using the first-interaction-mode 46 is audible (e.g. "please enter destination"), and there is no hesitation by the passenger 18 when entering the destination, then the same audible means is used to convey the confirmation 64 of destination provided by passenger 18.

However, if there is hesitation on the part of the person 24 when the message 30 is conveyed using the first-interaction-mode 46, so the system 10 uses the second-interaction-mode 48 to convey the message 30, then the system 10 may also convey the confirmation 64 using second-interaction-mode 48 when the pedestrian 16 responds to the message 30 that was conveyed in the second-interaction-mode 48. That is, the controller-circuit 36 may be configured to operate the output-device 28 in accordance with the second-interaction-mode 48 to convey a confirmation 64 in response to a determination that the reaction 34 to the message 30 conveyed in the second-interaction-mode 48 does not correspond to hesitation 26 (i.e. further hesitation) by the person 24.

The system 10 may also be configured to store information regarding instances when the hesitation 26 was detected, and what interaction-modes were in use when the hesitation 26 was detected. the information may be stored on-board the host-vehicle 12, or stored in the cloud-memory. The stored information may include, for example, a demographic characterization of the person and/or the location where the interaction caused the hesitation 26. This information may be used by the host-vehicle 12 and other AMODs to avoid hesitation at future interaction events.

Figure 3:
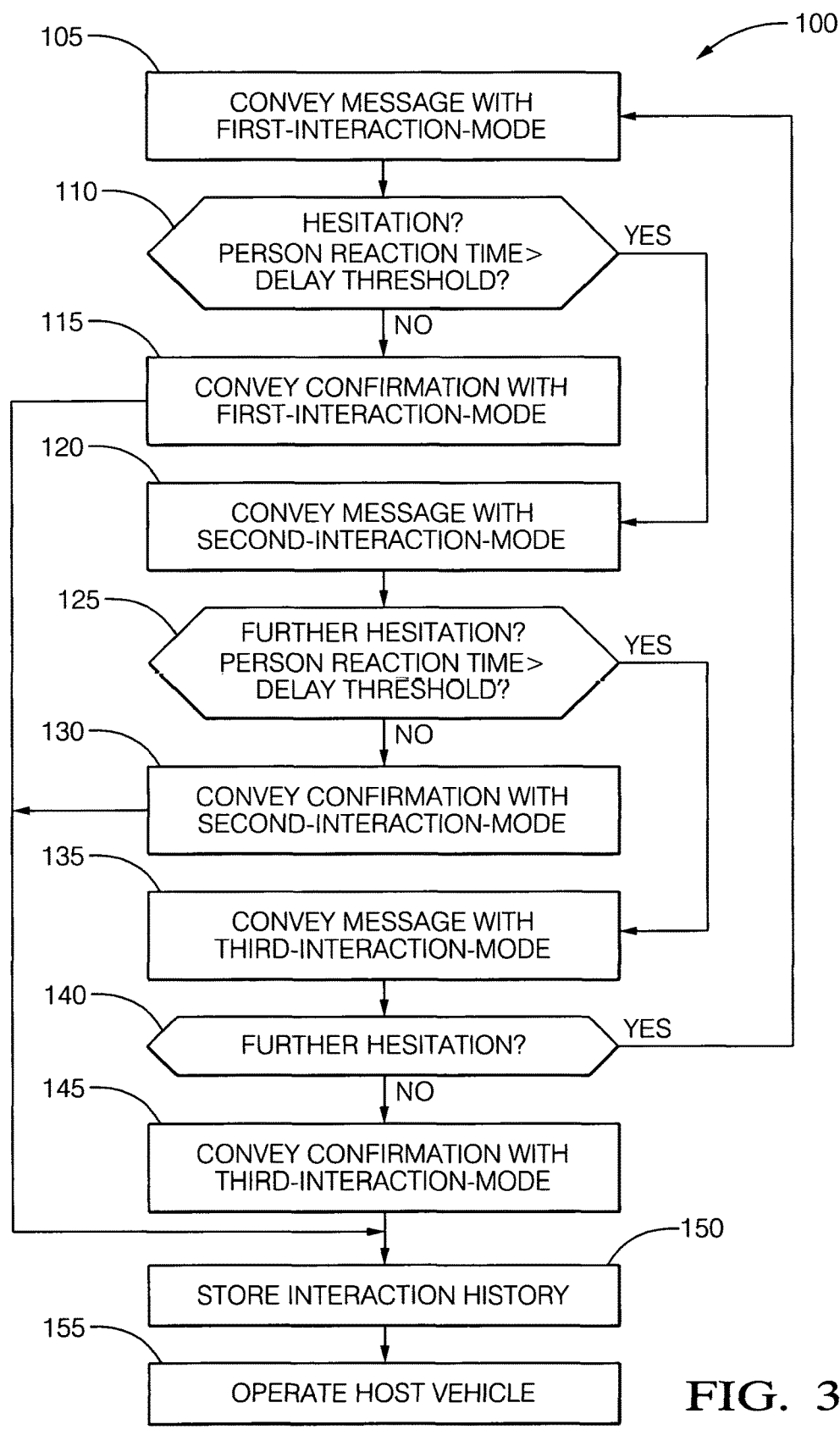
FIG. 3 is method of operating the system of FIG. 1 in accordance with one embodiment.

FIG. 3 illustrates a non-limit example of a method 100 of operating the system 10.

Step 105, CONVEY MESSAGE WITH FIRST-INTERACTION-MODE, may include conveying, using the output-device 28, (i.e. operating the output-device 28 to convey) a message 30 from a host-vehicle 12 to a person 24, where the output-device 28 is operated in accordance with a first-interaction-mode 46 to convey the message 30. As noted above, there are innumerably ways the first-interaction-mode 46 could be configured to convey the message 30 to the person 24.

Step 110, HESITATION?, may include using a perception-device for detecting a reaction 34 to the message by the person 24, and determining if the reaction corresponds to hesitation 26 by the person 24. As a specific non-limiting example, step 110 may include the step PERSON REACTION TIME>DELAY-THRESHOLD?, which may include monitoring movement by the person 24, where in this example the hesitation 26 is characterized as no reaction to the message 30 by the person 24 for more than a delay-threshold 56. Alternatively, other indicators of hesitation, e.g. confusion, may be detected by analyzing images of the face of the person 24 to check for certain facial expressions that are an indication of confusion which can lead to hesitation. If hesitation 26 is not detected, the method 100 proceeds to step 115. However, if hesitation is detected, the method proceeds to step 120 where the message 30 is repeated using a different interaction-mode, e.g. the second-interaction-mode 48.

Step 115, CONVEY CONFIRMATION WITH FIRST-INTERACTION-MODE, may include operating the output-device 28 in accordance with the first-interaction-mode 46 to convey a confirmation 64 in response to a determination that the reaction 34 does not correspond to hesitation 26 by the person 24. That is, if the person 24 does not hesitate to the message 30 delivered using the first-interaction-mode 46, then the first-interaction-mode 46 is used to deliver the confirmation 64. The confirmation 64 may be any response to an expected and timely reaction to the message 30, e.g. entering the host-vehicle 12 by the client 20, or crossing in front of the host-vehicle 12 by the pedestrian 16.

Step 120, CONVEY MESSAGE WITH SECOND-INTERACTION-MODE, may include, in response to hesitation 26 by the person 24, using the output-device 28 to convey the message 30 from a host-vehicle 12 to the person 24 in accordance with a second-interaction-mode 48. That is, the output-device 28 is operated in accordance with the second-interaction-mode 48 to convey the message 30. The second-interaction-mode 48 is different from the first-interaction-mode 46.

Step 125, FURTHER HESITATION?, may include detecting, using the perception-device 32, the reaction 34 to the message 30 by the person 24 when the message 30 is sent using the second-interaction-mode 48. Step 123 may also include determining that the reaction 34 corresponds to hesitation 26, which may include, for example, executing the step PERSON REACTION TIME>DELAY-THRESHOLD? This step detects when the hesitation 26 is characterized as no reaction to the message 30 by the person 24 for more time than a delay-threshold 56. Alternatively, the hesitation 26 may be based on the detection of a facial expression by the person 24.

Step 130, CONVEY CONFIRMATION WITH SECOND-INTERACTION-MODE, may include operating the output-device 28 in accordance with the second-interaction-mode 48 to convey a confirmation 64 in response to a determination that the reaction 34 to the message 30 conveyed using the second-interaction-mode 48 does not correspond to further hesitation by the person 24. That is, the confirmation 64 is output using the second-interaction-mode 48 if the person 24 properly responds to an instance of the message 30 that was conveyed using the second-interaction-mode 48 because the first-interaction-mode 46 was apparently ineffective to convey the message 30.

Step 135, CONVEY MESSAGE WITH THIRD-INTERACTION-MODE, may include conveying the message using yet a third-interaction-mode. The third-interaction-mode may be entirely different from the first-interaction-mode 46 and the second-interaction-mode 48, or may combine elements/features from either of the two modes with entirely new elements/features.

Step 135, FURTHER HESITATION?, may include again determining if the person 24 is exhibiting signs of hesitation 26, and routing the logic path of the method 100 accordingly. If the third-interaction-mode is finally successful in getting the person 24 to respond, the method 100 proceeds to step 140. However, if the person 24 still exhibits signs of hesitation, the method 100 show here starts again with the first-interaction-mode. Alternatively, the method 100 could try yet a fourth-interaction-mode, or just give up trying to convey the message 30 to the person 24.

Step 140, CONVEY CONFIRMATION WITH THIRD-INTERACTION-MODE, may include using the third-interaction-method to convey the message 30 since the third-interaction-method was apparently effective at getting a proper and timely response from the person 24.

Step 150, STORE INTERACTION HISTORY, may include storing data regarding the interaction such as which if the interaction modes worked to convey the message 30 to the person 24. The data stored may also include available information about the person such as sex, age, race, etc. The data stored may also include information about the location and ambient conditions, e.g. daytime or nighttime, and/or various weather data.

Step 155, OPERATE HOST-VEHICLE, may include the controller 36 autonomously operating the host-vehicle 12 to travel to a destination specified by the person 24.

Described herein is a first device 36 that includes one or more processors 38; memory 40; and one or more programs 105-150 stored in memory 40, the one or more programs including instructions for performing all or part of the method 100. Also, described herein is non-transitory computer-readable storage-medium 40 comprising one or more programs 105-150 for execution by one or more processors 38 of a first device 36, the one or more programs 105-150 including instructions which, when executed by the one or more processors 38, cause the first device 36 to perform all or part of the method 100.

Accordingly, a system 10, a controller 36 for the system 10, and a method 100 of operating the system 10 are provided. The teachings disclosed herein provide for an automated vehicle (e.g. the host-vehicle) that can adapt to situations when a person 24 apparently does not understand or does not perceive instructions or inquiries output by the automated vehicle, where those instructions or inquiries are useful for the automated operation of the automated vehicle While this invention has been described in terms of the preferred embodiments thereof, it is not intended to be so limited, but rather only to the extent set forth in the claims that follow.

We claim:

1. A system for operating an automated vehicle, said system comprising:
   an output-device configured to convey a message from a host-vehicle to a person external to the host-vehicle;
   a perception-device configured to detect a reaction to the message by the person, wherein the person is a passenger residing in the host-vehicle or a client preparing to enter the host-vehicle;
   a controller-circuit in communication with the output-device and the perception-device, said controller-circuit configured to operate the output-device in accordance with a first-interaction-mode to convey the message, determine that the reaction corresponds to hesitation by the person, and in response to hesitation by the person, operate the output-device in accordance with a second-interaction-mode to convey the message, wherein the second-interaction-mode is different from the first-interaction-mode.

2. The system in accordance with claim 1, wherein the hesitation is characterized as no reaction to the message by the person for more than a delay-threshold.

3. The system in accordance with claim 1, wherein the controller-circuit is configured to operate the output-device in accordance with the first-interaction-mode to convey a confirmation in response to a determination that the reaction does not correspond to hesitation by the person.

4. The system in accordance with claim 1, wherein the controller-circuit is configured to operate the output-device in accordance with the second-interaction-mode to convey a confirmation in response to a determination that the reaction to the message in the second-interaction-mode does not correspond to further hesitation by the person.

5. A controller-circuit for operating an automated vehicle, said controller-circuit comprising:
   an output configured to communicate with an output-device that is configured to convey a message from a host-vehicle to a person external to the host-vehicle;
   an input configured to communicate with a perception-device that is configured to detect a reaction to the message by the person, wherein the person is a passenger residing in the host-vehicle or a client preparing to enter the host-vehicle;
   a processor in communication with the output-device and the perception-device, said processor configured to operate the output-device in accordance with a first-interaction-mode to convey the message, determine that the reaction corresponds to hesitation by the person, and in response to hesitation by the person, operate the output-device in accordance with a second-interaction-mode to convey the message, wherein the second-interaction-mode is different from the first-interaction-mode.

6. The controller-circuit in accordance with claim 5, wherein the hesitation is characterized as no reaction to the message by the person for more than a delay-threshold.

7. The controller-circuit in accordance with claim 5, wherein the processor is configured to operate the output-device in accordance with the first-interaction-mode to convey a confirmation in response to a determination that the reaction does not correspond to hesitation by the person.

8. The controller-circuit in accordance with claim 5, wherein the processor is configured to operate the output-device in accordance with the second-interaction-mode to convey a confirmation in response to a determination that the reaction to the message in the second-interaction-mode does not correspond to further hesitation by the person.

9. A method of operating an automated vehicle, said method comprising:
   conveying, using an output-device, a message from a host-vehicle to a person external to the host-vehicle, wherein the output-device is operated in accordance with a first-interaction-mode to convey the message;
   detecting, using a perception-device, a reaction to the message by the person, wherein the person is a passenger residing in the host-vehicle or a client preparing to enter the host-vehicle;

determining that the reaction corresponds to hesitation by the person; and in response to hesitation by the person, conveying, using an output-device, a message from a host-vehicle to a person, wherein the output-device is operated in accordance with a second-interaction-mode, said wherein the second-interaction-mode is different from the first-interaction-mode.

10. The method in accordance with claim 9, wherein the hesitation is characterized as no reaction to the message by the person for more than a delay-threshold.

11. The method in accordance with claim 9, wherein the method includes operating the output-device in accordance with the first-interaction-mode to convey a confirmation in response to a determination that the reaction does not correspond to hesitation by the person.

12. The method in accordance with claim 9, wherein the method includes operating the output-device in accordance with the second-interaction-mode to convey a confirmation in response to a determination that the reaction to the message in the second-interaction-mode does not correspond to further hesitation by the person.

13. The system in accordance with claim 1, wherein the person is a client preparing to enter the host-vehicle.

14. The system in accordance with claim 1, wherein the message conveyed using the first-interaction-mode corresponds to the message conveyed using the second-interaction-mode.

15. The system in accordance with claim 1, wherein the message conveyed using the first-interaction-mode is an audible message, and the message conveyed using the second-interaction-mode is a visible message.

16. The controller-circuit in accordance with claim 5, wherein the person is a client preparing to enter the host-vehicle.

17. The controller-circuit in accordance with claim 5, wherein the message conveyed using the first-interaction-mode corresponds to the message conveyed using the second-interaction-mode.

18. The controller-circuit in accordance with claim 5, wherein the message conveyed using the first-interaction-mode is an audible message, and the message conveyed using the second-interaction-mode is a visible message.

19. The method in accordance with claim 9, wherein the person is a client preparing to enter the host-vehicle.

20. The method in accordance with claim 9, wherein the message conveyed using the first-interaction-mode corresponds to the message conveyed using the second-interaction-mode.

21. The method in accordance with claim 9, wherein the message conveyed using the first-interaction-mode is an audible message, and the message conveyed using the second-interaction-mode is a visible message.

* * * * *